United States Patent
Sharpe

(10) Patent No.: US 11,694,272 B2
(45) Date of Patent: Jul. 4, 2023

(54) METHOD AND APPARATUS FOR INSURANCE MANAGEMENT SYSTEM

(71) Applicant: TranSharpe Solutions, LLC, Charlotte, NC (US)

(72) Inventor: Andrew Sharpe, Charlotte, NC (US)

(73) Assignee: Transharpe Soltions, LLC, Charlotte, NC (US)

( * ) Notice: Subject to any disclaimer, the term of this patent is extended or adjusted under 35 U.S.C. 154(b) by 0 days.

(21) Appl. No.: 17/024,395

(22) Filed: Sep. 17, 2020

(65) Prior Publication Data

US 2021/0082055 A1    Mar. 18, 2021

Related U.S. Application Data

(60) Provisional application No. 62/901,389, filed on Sep. 17, 2019.

(51) Int. Cl.
| | |
|---|---|
| *G06Q 40/00* | (2023.01) |
| *G06Q 40/08* | (2012.01) |
| *G06F 16/90* | (2019.01) |
| *G06Q 10/10* | (2023.01) |

(52) U.S. Cl.
CPC .......... *G06Q 40/08* (2013.01); *G06F 16/90* (2019.01); *G06Q 10/10* (2013.01)

(58) Field of Classification Search
USPC ............... 705/34, 39, 36, 37, 5, 4, 7.15, 32; 239/380, 379; 701/31.4; 707/17.017
See application file for complete search history.

(56) References Cited

U.S. PATENT DOCUMENTS

| | | | | |
|---|---|---|---|---|
| 8,788,375 B2* | 7/2014 | Podgurny | ............ | G06Q 40/12 705/32 |
| 9,183,593 B2* | 11/2015 | Willis | ............ | G06Q 40/08 |
| 10,824,500 B1* | 11/2020 | Shoemaker | ............ | G07C 5/12 |
| 2003/0236601 A1* | 12/2003 | McLeod | ............ | B60L 58/12 701/31.4 |
| 2008/0021759 A1* | 1/2008 | Wasley | ............ | G06Q 10/063114 705/7.15 |
| 2008/0281741 A1* | 11/2008 | Hyde | ............ | G06Q 40/00 705/35 |

(Continued)

OTHER PUBLICATIONS

Services-Oriented CRM System and Enabling Technologies for Insurance Enterprises; 2009 Second International Workshop on Knowledge Discovery and Data Mining (pp. 737-740); Yongbin Huang, Jianfeng Wang; Jan. 23, 2009. (Year: 2009).*

(Continued)

*Primary Examiner* — Tien C Nguyen
(74) *Attorney, Agent, or Firm* — Foundation Law Group LLP; J D Harriman

(57) ABSTRACT

The system provides a method and apparatus for tracking and managing insurance coverage for an enterprise. In one embodiment, the system provides automated reports that include all types of coverage in a single report with a visual representation that fully informs the reader of status and areas of risk and concern. The reports are fully sortable and can provide a single resource for management of all policies and coverages of an enterprise. In one embodiment the system presents data in a unique grid that provides important information at a glance and enhances management of the system.

6 Claims, 13 Drawing Sheets

(56) References Cited

U.S. PATENT DOCUMENTS

| | | | | |
|---|---|---|---|---|
| 2008/0312969 | A1* | 12/2008 | Raines | G06Q 10/10 705/4 |
| 2009/0192828 | A1* | 7/2009 | Yunker | G06Q 40/08 705/4 |
| 2010/0228581 | A1* | 9/2010 | DeFrancesco | G06Q 10/10 707/E17.017 |
| 2013/0317860 | A1* | 11/2013 | Schumann, Jr. | G06Q 40/08 705/4 |
| 2014/0095214 | A1* | 4/2014 | Mathe | G06Q 40/08 705/4 |
| 2014/0149148 | A1* | 5/2014 | Luciani | G06Q 40/08 705/4 |
| 2015/0006206 | A1* | 1/2015 | Mdeway | G06Q 40/08 705/4 |
| 2016/0189311 | A1* | 6/2016 | Erickson | B60K 35/00 705/4 |
| 2018/0322426 | A1* | 11/2018 | Schmaltz | G06Q 10/0637 |
| 2019/0332661 | A1* | 10/2019 | Halprin Limor | G06Q 40/08 |
| 2020/0111170 | A1* | 4/2020 | Oldham | G06Q 30/0278 |

OTHER PUBLICATIONS

PriPAYD: Privacy-Friendly Pay-As-You-Drive Insurance; IEEE Transactions on Dependable and Secure Computing (vol. 8, Issue: 5, pp. 742-755); C. Troncoso, G. Danezis; E. Kosta, J. Balasch, B. Preneel; Nov. 24, 2010. (Year: 2010).*

Insurematic : Gernalized framework for Insurance company to Automate Insurance process; 2020 International Conference on Information Science and Communication Technology (ICISCT) (pp. 1-4); Muhammad Shaikh, Sellappan Palaniappan Touraj Khodadadi, Muhammad Khurram, Muhammad Khan; Huza; Feb. 8, 2020. (Year: 2020).*

* cited by examiner 201 202 203 204 205 206 207 208 209

🏠Home ▢Clients ▢Policies ▢Vehicles ▢Insurers ▢Contracts ▢Lienholders ▢Agencies ▢Settings >

Clients          ⌂>Clients

Clients [+Add][Export]—210    215    [Show|Active ▼] [Search 🔍]

| Name↑ | Agency | Producer | CSR | Policies(M) | Units | AI | CG | PD | NT | OA | PA | Drivers | Reports | OPTIONS |
|---|---|---|---|---|---|---|---|---|---|---|---|---|---|---|
|   | 211 | 212 | 213 | 214 | | | | | | | | | | |
| Advantage Logistics, Inc | Transure-A Relation Company | Andy Sharpe | Deb Aldridge | 0(19) | ⊚ | 0 | 0 | 0 | 0 | 1 | 0 | 2 | ⊚ | ⊚⊗⊕ |
| Alliance Cargo, Inc. | Transure-A Relation Company | Andy Sharpe | Deb Aldridge | 2(19) | ⊚ | 0 | 0 | 0 | 0 | 0 | 0 | 1 | ⊚ | ⊚⊗⊕ |
| All-State Express, Inc. | Transure-A Relation Company | Andy Sharpe | | 1 | ⊚ | 0 | 0 | 0 | 0 | 0 | 0 | 71 | ⊚ | ⊚⊗⊕ |
| Alpha Express, LLC | Transure-A Relation Company | Andy Sharpe | Deb Aldridge | 2(0) | ⊚ | 0 | 0 | 0 | 0 | 0 | 0 | 2 | ⊚ | ⊚⊗⊕ |
| AmbuFreight, Inc. | Transure-A Relation Company | Andy Sharpe | Deb Aldridge | 2(19) | ⊚ | 0 | 0 | 0 | 0 | 0 | 0 | 1 | ⊚ | ⊚⊗⊕ |
| American Transport Services, LLC | Transure-A Relation Company | Pete Smelzer | Sue Dix | 4 | ⊚ | 0 | 204 | 179 | 112 | 124 | 0 | 130 | ⊚ | ⊚⊗⊕ |
| APEX PTO and Trailer, Inc. | Transure-A Relation Company | Bob Gunn | Michelle Cobb | 1 | ⊚ | 0 | 0 | 52 | 0 | 0 | 0 | 0 | ⊚ | ⊚⊗⊕ |
| Ard Trucking Company Inc. | Transure-A Relation Company | Andy Sharpe | Deb Aldridge | 3 | ⊚ | 545 | 545 | 420 | 0 | 0 | 0 | 0 | ⊚ | ⊚⊗⊕ |
| B & A Hyder Trucking (Dump Trucks) | Transure-A Relation Company | Andy Sharpe | Sue Dix | 2(3) | ⊚ | 4 | 0 | 4 | 0 | 0 | 0 | 0 | ⊚ | ⊚⊗⊕ |
| B & A Hyder Trucking Co. Inc (P) | Transure-A Relation Company | Andy Sharpe | Sue Dix | 3 | ⊚ | 56 | 56 | 56 | 0 | 0 | 0 | 0 | ⊚ | ⊚⊗⊕ |

⌂ Home  ⌂ Clients  ⌂ Policies  ⌂ Vehicles  ⌂ Insurers  ⌂ Contracts  ⌂ Lienholders  ⌂ Agencies  ⌂ Settings >

Client Reports                                                                                      ⌂ > Clients > Edit Client Client VIMS Demo 4.21.20

PD Policies Report 401

| Policy Term | Policy # | Avg Values | Monthly Rate | Monthly Average |
|---|---|---|---|---|
| 04-01-2020-04-01-2021 | PD-DE-MO-42120 | $2,605,-243.00 | 0.375% | $10,297.25 |

OA Policies Report 402

| Policy Term | Policy # | Avg # Drivers | Rate | Monthly Average |
|---|---|---|---|---|
| 04-01-2020-04-01-2021 | OA-DE-MO-42120 | 18 | $130.00 | $2,383.33 |

AL Policies Report 403

| Policy Term | Policy # | Avg # Units | Avg Power Units | Avg Non-Power Units | Rate | Monthly Average |
|---|---|---|---|---|---|---|
| 04-01-2020-04-01-2021 | AL-DE-MO-42120 | 28 | 17 | 10 | $0.00 | $0.00 |

NT Policies Report 404

| Policy Term | Policy # | Avg # Units | Avg Power Units | Avg Non-Power Units | Rate | Monthly Average |
|---|---|---|---|---|---|---|
| 04-01-2020-04-01-2021 | NT-DE-MO-42120 | 4 | 6 | 0 | $35.00 | $151.67 |

PA Policies Report 405

| Policy Term | Policy # | Avg # Units | Avg Power Units | Avg Non-Power Units | Rate | Monthly Average |
|---|---|---|---|---|---|---|

No data found...

CG Policies Report 406

| Policy Term | Policy # | Avg # Units | Avg Power Units | Avg Non-Power Units | Rate | Monthly Average |
|---|---|---|---|---|---|---|
| 07-01-2020-07-01-2021 | CG-DE-MO-4.21.20 | 27 | 17 | 10 | $0.00 | $0.00 |

Vehicle Policy Summary 407

● Home ● Clients ● Policies ● Vehicles ● Insurers ● Contracts ● Lienholders ● Agencies ● Settings >

Client Reports        ● > Clients > Edit Client

Client

VIMS Demo 4.21.20 _410_    ● ●

PD Policies Report (PD-DEMO-42120) _411_

| Report Date | Values | Monthly Average | Monthly Total | Report(+/-) | |
|---|---|---|---|---|---|
| PD-2020-06-01 | $2,842,096.00 | 0.375% | $11,233.38 | ● ● | Regenerate |
| PD-2020-07-01 | $2,557,873.00 | 0.375% | $10,109.99 | ● ● | Regenerate |
| PD-2020-08-01 | $2,415,760.00 | 0.375% | $9,548.36 | ● ● | Regenerate |
| Total | | | $30,891.74 | | |
| Average | $2,605,243.00 | 0.375% | $10,297.25 | | Expired PD Policies |

♠Home ♠Clients ♠Policies |♠Vehicles| ♠Insurers ♠Contracts ♠Lienholders ♠Agencies ♠Settings >

Vehicles — 500

♠>Clients

| Vehicles |+Add||Export| | | | | | | | Coverage | Status | | Unit Type | | Search | 🔍 |
|---|---|---|---|---|---|---|---|---|---|---|---|---|---|---|
| | | | | | | | | All ▾ | Active ▾ | | Power Units ▾ | | | |
| 501 | 502 | 503 | 504 | 505 | 506 | 507 | 508 | | 509 | | | 510 | Previous 1 2 | |
| Unit | VIN (Vehicle Id #) | Year | Make | AddedDate↓ | Value | Client Name | Type | DT AL CG | PD NT | OA PA | OPTIONS | Driver◉ | Owner | 511 |
| 014 | 1FUjGLDR3HJHM7754 | 2017 | Freightliner | 08-08-2020 | $45,000 | Empire National, Inc. | Tractor IC | ◯ ◯◯◯ | ◯◯ | ◯ | ◯⊙⊗◯⊖ | Sedrick Jackson | |
| 010 | 1FUjGLD69GLHA7212 | 2016 | Freightliner | 08-08-2020 | $35,000 | Empire National, Inc. | Tractor IC | ◯ ◯◯◯ | ◯◯ | ◯ | ◯⊙⊗◯⊖ | Viktor Gleb | |
| 116 | 3AK|GLD57F5GM5995 | 2015 | Freightliner | 08-08-2020 | $35,000 | Empire National, Inc. | Tractor IC | ◯ ◯◯◯ | ◯◯ | ◯ | ◯⊙⊗◯⊖ | | Sergey Korolchuk |
| 012 | 3AKjHHDRSKSKE9456 | 2019 | Freightliner | 08-08-2020 | $100,000 | Empire National, Inc. | Tractor IC | ◯ ◯◯◯ | ◯◯ | ◯ | ◯⊙⊗◯⊖ | | Igor Korolchuk |
| 304 | 1FUJA6CK17DX33784 | 2007 | Freightliner | 08-08-2020 | $5,000 | Empire National, Inc. | Tractor IC | ◯ ◯◯◯ | ◯◯ | ◯ | ◯⊙⊗◯⊖ | | |
| 1701 | 3AK|GLDR2HS119511 | 2016 | Freightliner | 08-08-2020 | $60,000 | Empire National, Inc. | Tractor IC | ◯ ◯◯◯ | ◯◯ | ◯ | ◯⊙⊗◯⊖ | | |
| 1801 | 31FUJGBDV8jLjY3321 | 2018 | Freightliner | 08-08-2020 | $80,000 | Empire National, Inc. | Tractor IC | ◯ ◯◯◯ | ◯◯ | ◯ | ◯⊙⊗◯⊖ | | |

Certificate of Insurance
801  Issue Date: 08/14/2019

| CSR/Agency 802 | Named Insured 803 | Vehicle Owner 804 |
|---|---|---|
| | VIMS Demo 32219<br>322 Demo Lane<br>Charlotte, North Carolina 28201 | Demo Owner 1 |

Vehicle: Volvo 2019  805     Unit #: 109  806     VIN: 1DEMOVIMS32200009  807

Auto Liability Coverage 808

| Policy # | Eff Date | End Date | Limits | Deductible | Insurance Company |
|---|---|---|---|---|---|
| AL-DEMO-32219 | 04/01/2019 | 04/01/2020 | $1,000,000 | $0 | Sentry Select Insurance Company |

Date Coverage Added
Notes:

Physical Damage Coverage 809

| Policy # | Eff Date | End Date | Stated Value | Deductible | Insurance Company |
|---|---|---|---|---|---|
| DemoPD-32219 | 03/22/2019 | 03/22/2020 | $109,000 | $1,000 | Underwriters at Lloyds of London |

Date Coverage Added
Loss Payee: Any loss is payable as interests may appear to the Insured and :

810

Unless otherwise stated above regarding independent contractors, all coverage ceases upon termination of Independent Contractor Operating Agreement by either party. All Coverage will cancel at 12:01 AM on the effective date of terminated Contractor Operating Lease Agreement or expiration of master insurance certificates whichever comes first. Coverage is cancelled regardless of whether Independent Contractor receives written cancellation notice.

This certificate is issued as a matter of information only and confers no rights upon the certificate holder. This certificate does not amend, extend or alter the coverage afforded by the policies shown above. This is to certify that policies of insurance described above have been issued to the insured named above for the policy period indicated. Notwithstanding any requirement, term, or condition of any contract or other document with respect to which the certificate may be issued or may pertain, the insurance afforded by the policies described herein is subject to all the terms, conditions, and exclusions of such policies. Should any of the above policies described be cancelled before the expiration date shown, insurer affording coverage will endeavor to email 10 days written notice to the certificate holder, but failures to do so shall impose no obligation of liability of any kind upon the insurer, its agents or representatives.

Agent Signature

■Home ■Clients ■Policies ■Vehicles ■Insurers ■Contracts ■Lienholders ■Agencies

Home 901 902 903 904

| 1 vehicle / 0 driver | 13 | 5 | 1 | ●>Dashboard |
|---|---|---|---|---|
| Response Needed | Power Units | Non Power Units | Driver Count | |

Expiring Policies 905

| Expiration Date | Client | Policy # | Coverage |
|---|---|---|---|
| 04-01-2021 | VIMSDemo April 19 2020 | AL-Demo-1920 | AL |
| 04-01-2021 | VIMSDemo April 19 2020 | PD-Demo-1920 | PD |
| 04-01-2021 | VIMSDemo April 19 2020 | NETT OA response needed | OA |

View all

Recent Vehicle Transactions 906

| Date | Client | Unit | Username | Transaction Type | Description |
|---|---|---|---|---|---|
| 09-10-2020, 10:02 AM | VIMSDemo April 19 2020 | 4:24 | Demo TranSharp | D | Response Needed PD |
| 09-11-2020, 2:47 PM | VIMSDemo April 19 2020 | 4:21 | Dev Admin xxxxx | C | Vehicle details updated |
| 09-11-2020, 12:56 PM | VIMSDemo April 19 2020 | 4:15 | Dev Admin xxxxx | C | Vehicle details updated |
| 09-11-2020, 12:44 PM | VIMSDemo April 19 2020 | 4:16 | Dev Admin xxxxx | C | Vehicle details updated |
| 09-11-2020, 12:44 PM | VIMSDemo April 19 2020 | 4:16 | Dev Admin xxxxx | C | Vehicle details updated |

View all

♠Home ♣Clients ▣Policies ♠Vehicles ♣Insurers ▣Contracts ♣Lienholders ♣Agencies

›Clients

Clients

| Clients | +Add | Export | | | | | | Show | Response Needed (V)▾ | Search | 🔍 |
|---|---|---|---|---|---|---|---|---|---|---|---|
| Name 1 | Agency | Producer | CSR | Policies(M) | Units | RN(V) | RN(0) | AL CG PD NT OA PA | Drivers | Reports | OPTIONS |
| VIMS Demo April 19 2020 | TranSharpe Solutions, LLC | Demo TranSharpe | Demo TranSharpe | 3 ⊚ | 1 ↙ 907 | 0 | 19 0 15 0 1 0 | 1 | ⊚ | ⊚⊛⊕ |

♠Home ♣Clients ▣Policies ♠Vehicles ♣Insurers ▣Contracts ♣Lienholders ♣Agencies

›Vehicles

Vehicles

| Client | | | | | | | | | Coverage | | # AL CG PD NT OA PA | Response Needed |
|---|---|---|---|---|---|---|---|---|---|---|---|---|
| VIMS DEMO April 19 2020 | | | | | | | | ⊚⊛⊚⊚ | Power Units | | 13 13 0 9 0 1 0 | ① 908 |
| | | | | | | | | | Non-Power Units | | 5 5 0 5 0 0 0 | |

909

| Vehicles | +Add | +Bulk Import | Export | | | | | | Coverage | Status | Unit Type | | | |
|---|---|---|---|---|---|---|---|---|---|---|---|---|---|---|
| | | | | | | | | | Response Needed▾ | Active ▾ | ALL ▾ | Previous 1 Next 100▾ Search 🔍 |
| ☐ Unit | VIN (Vehicle Id #) | Year | Make | Radius | AddedDate↓ | Value | Type | DT AL CG PD OA | OPTIONS | ⊚ Driver ⊚ Owner Lienholder More▾ |
| ☐ 424 | 42720DEMO24-202323 | 2012 | | | 04-27-2020 | $25 | Tractor | E ⊚ ⊚ ⊚ ↙ 910 | ⊚⊛⊚⊗⊕ | VIMS Owner 2429 |

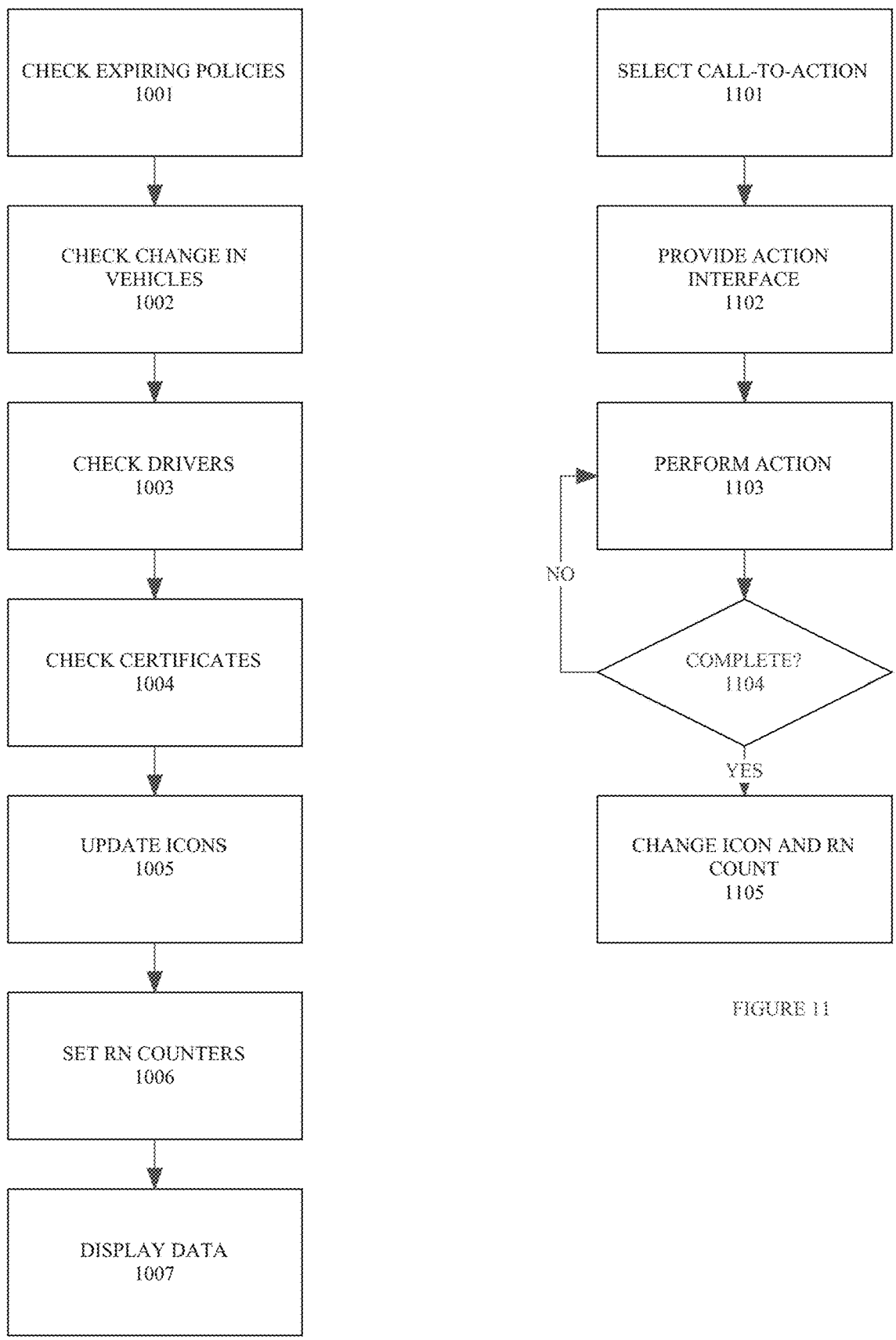

METHOD AND APPARATUS FOR INSURANCE MANAGEMENT SYSTEM

This patent application claims priority to U.S. Provisional Patent Application Ser. No. 62/901,389 filed on Sep. 17, 2019 which is incorporated by reference herein in its entirety.

BACKGROUND OF THE SYSTEM

Many enterprises must obtain and maintain a wide range of insurance coverages to protect against loss. It is important for an enterprise to not be over-insured, which adds to overhead and expenses. It is also important for an enterprise to not be under-insured, which can lead to uncovered losses. In some instances, the failure to have the correct insurance may be prohibited, either by statute, practice, contractual agreement, trade association requirements, and the like. Tracking multiple types of insurance and multiple policies presents a problem for many enterprises.

In the prior art, an enterprise may manually maintain databases and/or spreadsheets for each coverage type as well as a master consolidated spreadsheet of all coverages. Making any change or update must be populated correctly over all databases and spreadsheets, which can lead to errors that affect coverage. The spreadsheets may be sent periodically to the insurance agent of the company to verify coverage by issuing certificates of insurance and premium invoices based on the spreadsheet. If the spreadsheet is wrong, the insurance agent may issue incorrect or insufficient policies and/or coverages.

SUMMARY

The system provides a method and apparatus for tracking and managing insurance coverage for an enterprise. In one embodiment, the system provides automated reporting systems that include all types of coverage in a single report with a visual representation that fully informs the reader of status and areas of risk and concern. The report is fully sortable and can provide a single resource for management of all policies and coverages of an enterprise. In one embodiment the system presents data in a unique grid that provides important information at a glance and enhances management of the system.

BRIEF DESCRIPTION OF THE DRAWINGS

FIG. 2 illustrates an example of an interface on the dashboard in an embodiment when the Client tab is selected.

FIG. 3 illustrates the Client tab 202 when a client edit option has been selected.

FIG. 4A illustrates a summary page for client reports.

FIG. 4B illustrates the PD reports from 401 of FIG. 4A.

FIG. 5 illustrates the vehicle tab in one embodiment.

FIG. 7 illustrates the interface when "drivers" is selected in FIG. 4, 5, or 6

FIG. 8 is an example of an insurance certificate issued by the system in an embodiment.

FIG. 9A is a home page in an embodiment of the system.

FIG. 9B illustrates a view after selecting RN(V).

FIG. 9C illustrates a view after selecting the entry in FIG. 9B.

FIG. 10 is a flow diagram illustrating the operation of the system in an embodiment.

FIG. 11 is a flow diagram illustrating responding to a call-to-action in an embodiment.

DETAILED DESCRIPTION OF THE SYSTEM

The system can be used to accomplish a number of operations related to enterprise insurance. One industry in particular with complex insurance needs is the transportation industry. A transportation company may use many drivers, either as employees or independent contractors, and use many vehicles, either owned, leased, or contracted. It is critical that all insurance obligations be met properly, avoiding over-insurance and under-insurance situations. The company must have a variety of insurance coverage types, including auto liability, physical damage, non-trucking liability, occupational accident, contingent liability, cargo insurance, general liability, passenger accident liability, and the like. Although the system is described in connection with a trucking enterprise, it is understood that it has equal application in any enterprise that has insurance.

Figure 1:
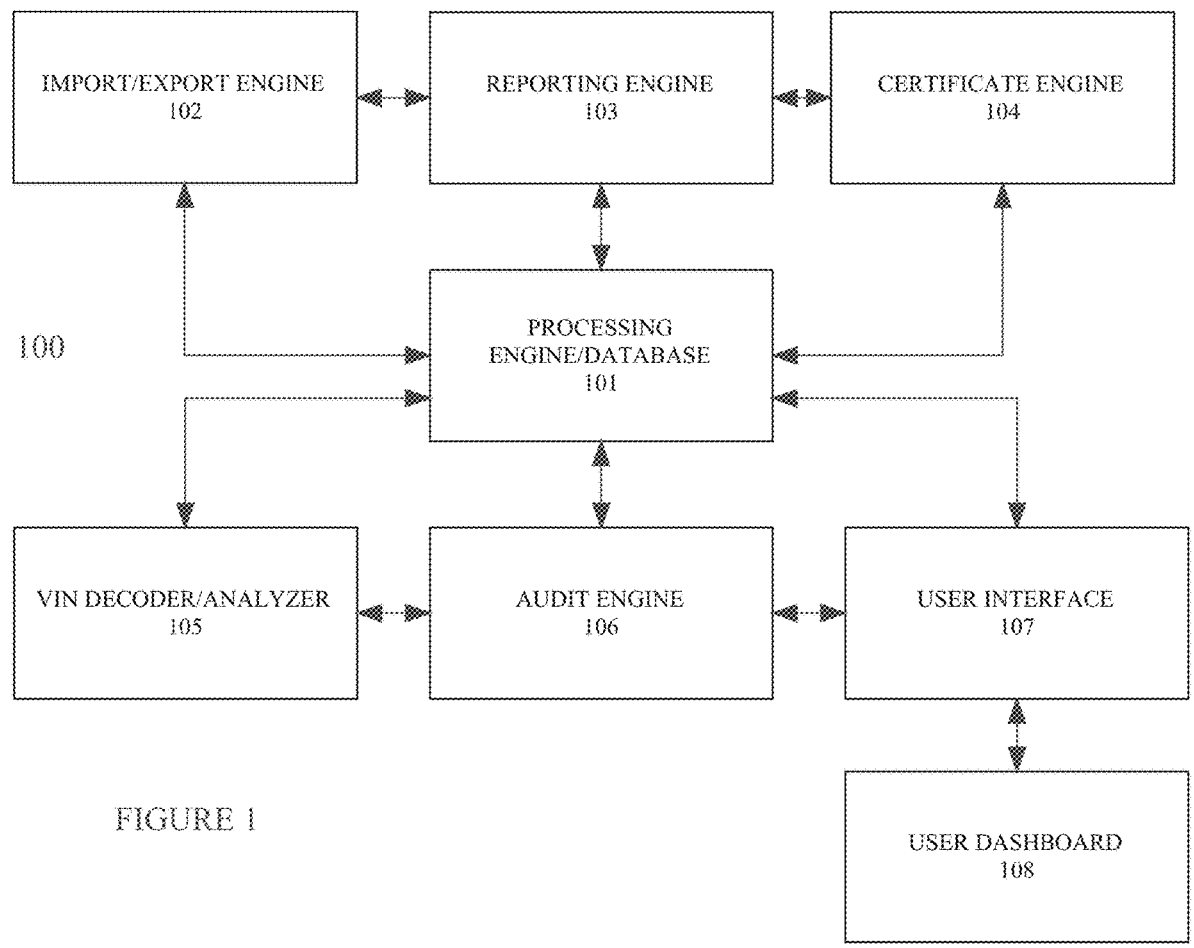
FIG. 1 is a block diagram of an embodiment of the system.

FIG. 1 is a functional block diagram of an embodiment of the system. The system 100 includes a processing engine/database 101 that provides the intelligence of the system and stores the data related to the elements of the insurance management system. This data includes the coverages, policy information, renewal dates, premiums, vehicles (asset type, ID, values, type of driver, lienholder information), sponsored and non-sponsored coverages, employee/independent contractor status, driver information (including some personally identifiable information that will be encrypted) and the like The system communicates with the outside world via import/export engine 102 and/or user interface 107. The import/export engine 102 can be used to send reports, alerts, communications, and the like as appropriate. In addition, import/export engine 102 can receive communications from transportation management systems (TMS), agency management systems (AMS), insureds, insurers, customers, and the like. The system includes the ability to import and export vehicle lists to and from spreadsheets (e.g. Excel) and provide alerts when data is not complete. Multi-user audit tracking is implemented to maximize reliability and accuracy of data. Client access is provided to permit direct changes while maintaining an audit trail for accountability.

The reporting engine 103 is used to generate the automatic and custom reports of the system. The reporting engine receives commands from the processing engine/database 101 including deadlines for report runs and will generate the required reports when triggered. The reporting engine 103 can also generate communications (e.g. texts, emails) with clients as desired, generate invoice, and the like. The system provides reporting for periodic (e.g. monthly) billing (e.g. monthly PD and NT billing). The system will save a report of enterprise status pursuant to policy requirements of reporting. For example, if a policy requires a report to be run on the $5^{th}$ of each month, the system will automatically save a report on that day. The system permits customization of all aspects of the reporting and data analytics.

Certificate engine 104 can generate and deliver vehicle certificates individually, in batches, and can do so based on values, owner, lienholder, and the like. The system can batch all certificates for a lienholder for example, and email them at once. In one embodiment the system can issue physical damage (PD) and non-trucking (NT) certificates. It can also issue occupational accident (OA) certificates and combined PD, NT, and OA on a single certificate. The system allows for batching of vehicles and batch production of multiple vehicle certificates (e.g. for all units with the same lienholder).

The VIN decoder/analyzer 105 checks the accuracy of VINs input to the system. The VIN decoder/analyzer 105 has multiple levels of checks for correct VINs, including analyzing the VIN itself for the correct number of digits, and recalling the vehicle description associated with the VIN to make sure it matches a vehicle that is in the system. The VIN decoder/analyzer 105 also checks automatically for duplicate VINs, avoiding errors in many parts of the system. The VIN decoder/analyzer 105 can catch mistakes in VIN entry, preventing downstream problems.

Audit engine 106 tracks which user makes changes to any data or meta-data in the system, with timestamps and date-codes. The audit engine 106 also tracks client changes made by users accessing the system via user interface 107. By allowing users to make changes, while maintaining an audit trail, efficiency and accuracy are promoted by the system. The user interface 107 communicates with a user dashboard 108.

The user dashboard 108 is used by a number of entities, including an agency (e.g. insurance agency) an insured (e.g. a trucking company) or others, to track a number of metrics. In one embodiment the user dashboard 108 allows the user to track expiring policies, recent vehicle transactions, recently added vehicles, recently deleted vehicles, non-sponsored policies, recent policy transactions, and the like.

The dashboard 108 also includes a clients summary page where the agency may add clients, initiate client summary exports, present policy counts (with linking to parent and grandparent clients, child and grandchild clients, etc.), units client transactions, insured unit summaries by coverage type and drivers, and the like.

The dashboard also includes a vehicles page for each client that includes sortable columns, the ability to add and delete vehicles, manage certificates, respond to a call-to-action, track lienholder/owner/drivers/transactions, and the like.

Unit coverage can be determined at a glance. In some situations, an enterprise may have independent contractors on both sponsored and non-sponsored plans. The system allows easy tracking of such situations.

The system has a number of advantages over prior art systems. The system provides a consolidated vehicle list, provides multiple user access and audit trail, can issue insurance certificates, provides employee access to online certificates, and provides reports at the frequency selected by the user. The system presents a color-coded and icon-based grid of unit coverages that allows a user to know status at a glance. The system includes a counter of responses and action items, and allows easy sorting to get to only the items that require action. This eliminates manual searching for action items.

FIG. 2 illustrates an example of an interface on the dashboard in an embodiment. The dashboard 200 has a plurality of tabs 201-209 that each represent an interface. The tabs include Home 201, Clients 202, Policies 203, Vehicles 204, Insurers 205, Contracts 206, Lienholders 207, Agencies 208, and Settings 209. The system may have additional, different, or fewer tabs as appropriate.

In FIG. 2 the Clients tab 202 is selected. The dashboard presents clients of an insurance agency in this example. The Clients 202 interface includes a number of columns including Name 201 (the name of the insured), Agency 211 (the insurance agency that is working with the insured to get the policy), Producer 212 (the agent of the agency who is handling the insured), CSR 213 (Customer Service Representative), and Policies 214. The "M" next to Policies represents the "master" or "parent" client policy. In one embodiment, the light blue color represents a clickable link so if the user clicks the number in this column, the system will redirect to the client policies listing. The number on the left represents child client policies. The system can manage grandchild/child/parent policy logic as well.

Region 215 in the Client tab 202 shows numerical information related to the column headings. In other tabs, the region may show iconic and/or graphical representations of information. Region 215 shows a plurality of columns related to the vehicles, including AL (Auto Liability), CG (Cargo) PD (Physical Damage), NT (Non-Trucking), OA (Occupational Accident), PA (Passenger Accident), Drivers, Reports and Options (Options include Edit vehicle, Delete unit, and Transaction/audit trail.

Figure 3:
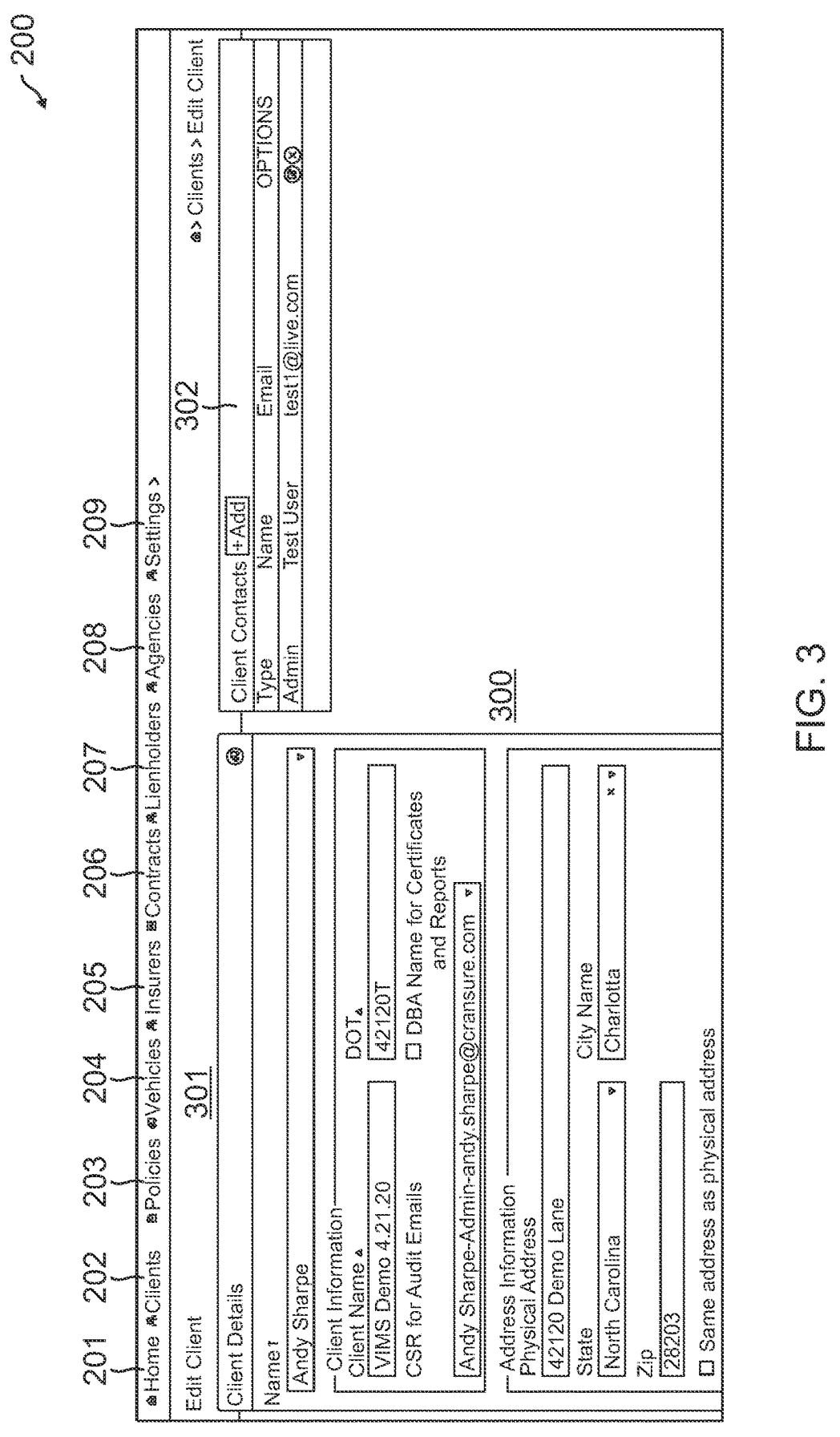

FIG. 3 illustrates the Client tab 202 when a client edit option has been selected. Selecting a client in Name 201 column brings up the interface 300 illustrated in FIG. 3. Region 301 includes fields for Client name, address, contact, and other information, including DOT # (Department of Transportation). Region 302 includes a list of client contacts, titles, and contact information (e.g. email). Client contact can also include permission logic to define contact roles and rights, as well as access to monthly reports, audit emails, and the like.

FIG. 4A illustrates a summary page for client reports. The interface is one that appears when a Report icon is selected in region 215 of FIG. 2 in an embodiment. The interface 400 shows a summary of reports for PD Policies 401, OA Policies 402, AL Policies 403, NT Policies 404, PA policies 405, CG Policies 406 and Vehicle Policy Summary 407. The report summaries may include policy term, policy number, average values, monthly rate, monthly average, and the like. Each report may have different summary information. For example, OA Report 402 includes the average number of drivers, AL report includes the average units, power units, and non-power units.

FIG. 4B illustrates a detailed report when the user selects, for example, summary 401 of FIG. 4A. The client is illustrated in region 410, with the type of report (e.g. PD Policies) in region 411. Policy detail is provided in region 412, including report date, values, monthly rate, monthly total, report +/−, and regenerate. The monthly summary view gives data as well as two report types per month; a PDF for invoice unit summary of costs and an Excel type report showing Adds/Deletes of units/drivers with net summary of change, information which is important to some insurance companies billing report requirements.

FIG. 5 illustrates the Vehicle tab 204 in one embodiment. The system provides an all-in-one consolidated vehicle list that makes it easy to manage real-time assets for clients. The system has built-in logic to reduce errors and omissions, data entry errors, and mis-identification of vehicles. The system includes a VIN decoder to make sure the vehicles have the proper number of digits and that make and model are accurate. This interface 500 includes columns for Unit 501, VIN 502, Year 503, Make 504 Added Date 505, Value 506, Client Name 507, Type 508, Status Region 509, Driver 510, and Owner 511.

Region 509 implements a practical system for displaying information that can be quickly digested and understood by a user. Region 509 includes information about DT, AL, CG, PD, NT, OA, PA, and Options. The columns typically include one entry per row, but in one embodiment, an "F" in a circle indicates that a future policy selection is present. Selecting the F will map to the new future policy and any active policy. The system uses, symbols and color to provide status information in each column. For example, a red circle with an exclamation point inside indicates that action is required. This icon is a call-to-action that means a response is needed. In one embodiment, this icon is a default icon alert for a unit that has no known coverage information. This means that someone needs to take actions to determine if the unit has sponsored coverage, or if a certificate needs to be issued for the unit, or if the unit has non-sponsored coverage.

A green check means the vehicle is confirmed for sponsored coverage. Coverage is entered and/or verified through a client sponsored program. A certificate of insurance is available for viewing. A blue check means the vehicle is confirmed for non-sponsored coverage. A certificate is not available but coverage dates and expiration dates are tracked in one embodiment of the system. As noted above, the green "F" in a circle refers to a future policy. If a unit is mapped to a current/active sponsored policy and a future policy then green check+F will be displayed. If it is a new client and/or new policy then there is no active policy so the "F" designation is helpful to know it's successfully mapped to a future effective date policy and the certificate icon is available for proof of future insurance. If active and future are present, on clicking of certificate icon both certificates will be generated; one for active policy and one for future policy.

The Options columns of region 509 include certificate generation (green circle), Email certificate (dark blue email symbol), Edit vehicle gold icon, Transaction/audit trail (opposing arrows) and Delete unit (gold x). The certificate generation icon will show one or more insurance certificates for a unit when selected. The Email icon will create an email with the certificate attached.

Figure 6:
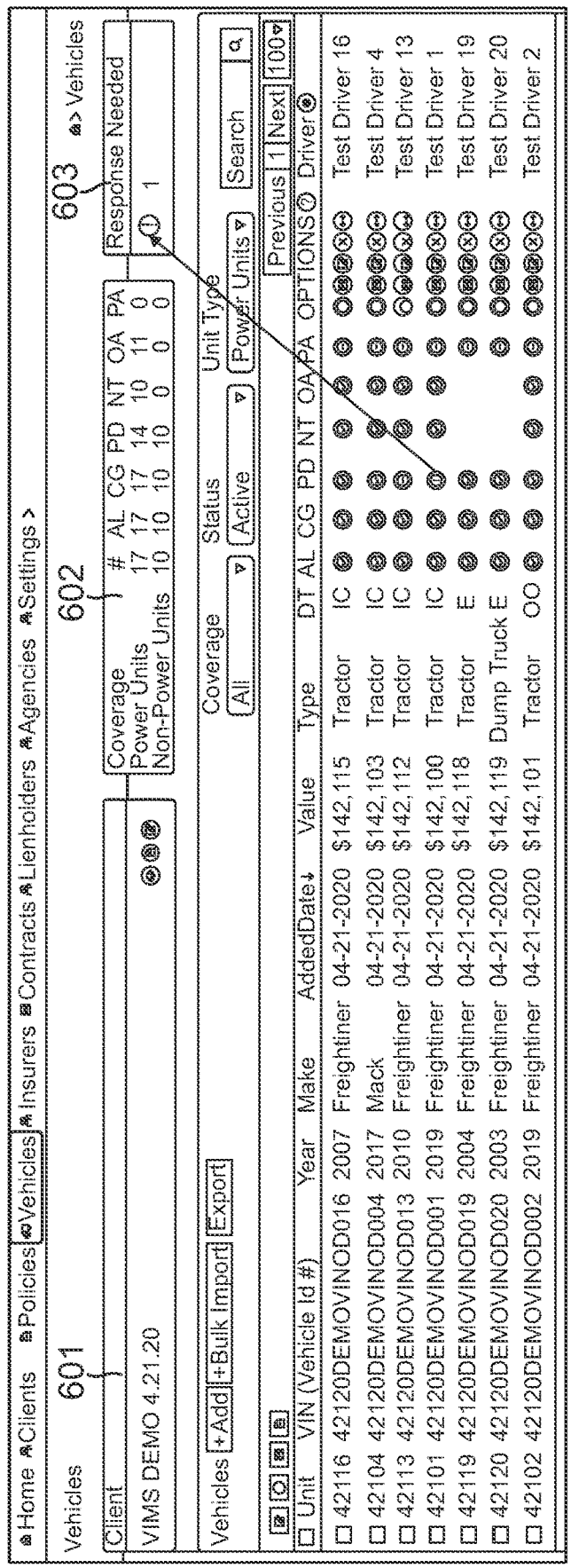
FIG. 6 illustrates the vehicle view filtered by client in an embodiment.

The user can select filter the Vehicle tab 204 to show only the vehicles for a particular client. An embodiment of that interface 600 is illustrated in FIG. 6. In this view the client is shown in region 601. A coverage summary is shown in region 602 and region 603 shows the responses needed. The user can click on the call-to-action in region 603 and the system will display only those units with response needed.

The goal is to get the Response Needed (RN) value to zero, meaning every vehicle has sponsored coverage, non-sponsored coverage, or coverage declined. In one embodiment, the user can click on the RN number on the Home tab 201 and it will display only the clients for which responses are needed. When the user selects one of those clients, the system will display the RN for that client. If the user selects the client RN number the system shows only the rows for the client vehicles needing responses. This allows the user to quickly take care of necessary responses.

Figure 7:
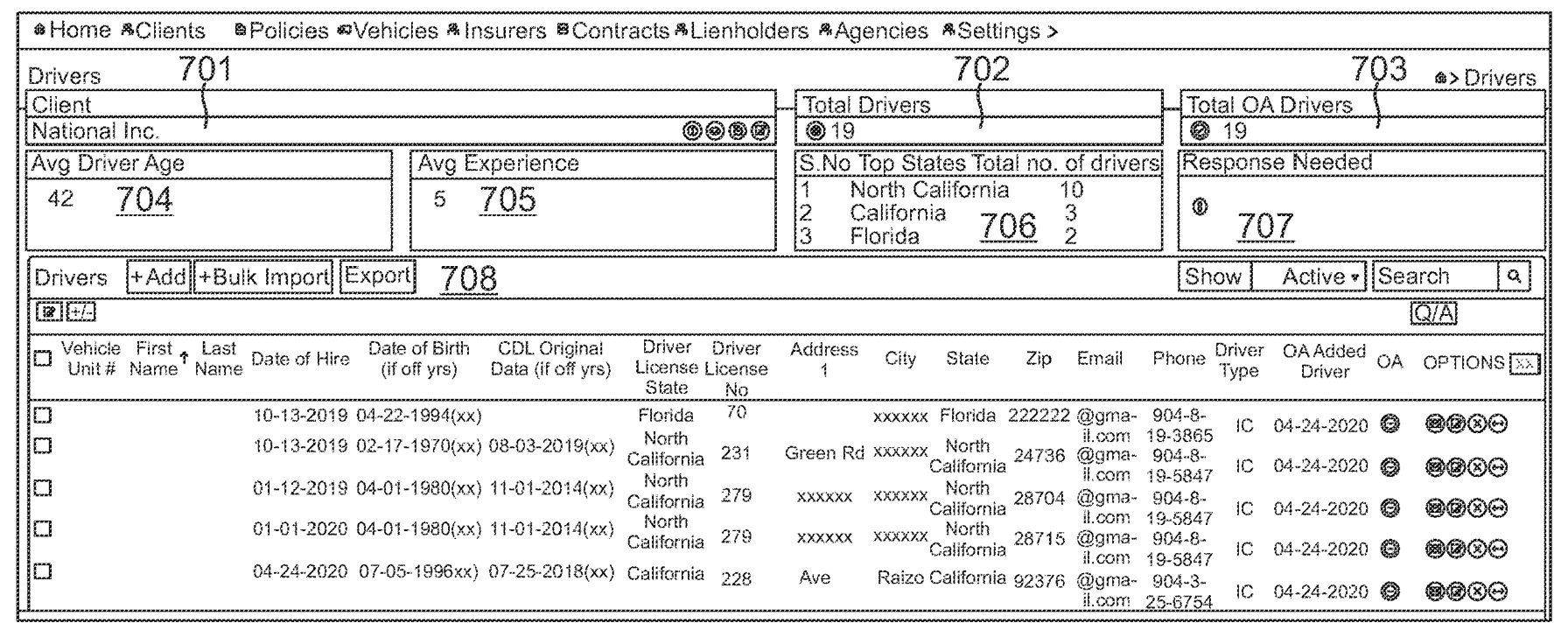

FIG. 7 illustrates the interface when "drivers" is selected in FIG. 4, 5, or 6. The interface 700 includes region 701 for the name of the client, region 702 shows the total number of drivers currently with the company. Region 703 shows the total of OA drivers. Region 704 is the average driver age, region 705 is the average number of years of experience of the drivers, and region 706 is the geographical location (e.g. by state) of the drivers.

Region 708 provides information about each driver. This region can be reduced to a more limited number of columns as desired. For example, the region could simply show vehicle unit, driver name, OA information, and the option field. In the expanded view, in one embodiment, the region 708 shows vehicle unit number (if a driver is attached to multiple units, no unit number is shown for that driver), name, date of hire, date of birth (and age), CDL original date (with number of years), license issue state, license number, address, contact information (address, email, phone, and the like), OA added date, and option field. The option field can contain icons that provide certificate, editing, deletion, and audit trail in one embodiment.

When the RN region 707 has a non-zero number, the system can isolate drivers who have an RN condition when the user clicks on the number in region 707. The system will display only those drivers who need some sort of action to be taken.

The RN region in every interface is powerful because it provides a practical way to identify and isolate action items that need to be accomplished to make sure that requirements are met and that the enterprise is in compliance. This practical solution is a benefit over prior art spreadsheet-based systems where the user needs to hunt down action items manually or perform a plurality of sorting operations to ensure that all action items are discovered, handled, and updated.

As described above, one of the Response Needed items is that coverage is missing from a certificate of insurance. In one example embodiment, the system is used in the insurance industry, in particular for truck fleet insurance. FIG. 8 is an example of an insurance certificate issued by the system in an embodiment. The certificate 800 can be automatically generated by the system. The certificate includes the date of issuance 801, the issuing agency 802, the named insured 803, and the vehicle owner 804, which may be different than the client, depending on the situation.

The certificate 800 automatically populates the vehicle 805, unit number 806 (defined by the insured 803), and the VIN 807 (note the VIN will be double checked by the VIN decoder/analyzer to make sure the VIN 807 matches the vehicle 805).

The coverages are listed, such as Auto Liability Coverage 808 and Physical Damage Coverage 809. The coverages include policy numbers, effective date (which may be different than the issue date), end date, limits, deductible, and the actual insurance company. Region 810 includes disclaimer language and the system anticipates e-signing region 811. This is a specific signature by the system attached Agency's approved licensed Producer. If no producer selected then no signature would be required, but in an embodiment, the Agency should have a Producer selected.

FIG. 9A is an example of the Home 201 interface 900 in an embodiment of the system. The interface 900 includes RN region 901 showing RN(V) for vehicles and RN(D) for drivers, Power Units 902, Non-power units 903, Driver count 904, expiring policies 905, and recent vehicle transactions 906. In one embodiment the Home tab can also show recently added vehicles, and recently deleted vehicles. The system will automatically generate important reports that track the net change in vehicles (newly added vs newly deleted) so that appropriate billing adjustments can be made. For example, in some circumstances, billing is a monthly "per power unit" rate. Therefore, a plus or minus change in the number of vehicles is used to calculate the change in rate. If there is a net increase of seven power units for example, the billing is adjusted up by seven times the monthly rate per power unit.

If the user selects RN(V) (showing 1 RN in this case) the system will display the interface as shown in FIG. 9B. This will filter to show only the client rows having RN(V) greater than zero (the same for RN(D). The interface includes region 905 which is a filter set to show RN (but the user can change that filter to display other data. Region 906 shows the client and the RN(V) column 907 shows the count of responses needed.

If the user selects the number in column 907, the system presents the interface as shown in FIG. 9C. Region 909 indicates the filter is "response needed". Region 910 graphically shows the coverage that requires a response. In this example, it is the PD policy that requires action.

Another advantage of the system is the ability to interface with third parties, including the Department of Transportation (DOT). This allows the system to obtain DOT information, FMCSA information, Safety inspections, and the like. The system can also integrate transportation management systems and agency management systems. These systems all have the ability and permission to add vehicles, delete vehicles, and edit vehicles, providing for a single system to replace multiple prior art systems.

FIG. 10 is a flow diagram illustrating the operation of the system in an embodiment. The steps of FIG. 10 may be performed on a per client basis, per agency basis, and the like. At step 1001 the system checks expiring policies. At step 1002 the system checks for net changes in vehicles. At step 1003 the system checks driver changes and updates, including unit assignments. At step 1004 the system checks certificates.

At step 1005 the system updates icons associated with system data based on the results of steps 1001-1004. For example, expiring policies and missing coverage will create a red action icon associated with the data. In one embodiment the dashboard will also display policies that are due to expire shortly (e.g. within some user determined time period). Expired policies are shown in Not Active policy pages for access by the user. Attached Reports for those Expired policies are accessible too. At step 1006 the system updates the Response Needed counters as appropriate (based on missing responses) and displays data at step 1007.

FIG. 11 is flow diagram illustrating a response to a call-to-action in an embodiment of the system. At step 1101 a user selects an icon indicating a response needed. As noted above, such an icon could be a red exclamation point in a circle. At step 1102 the system provides the proper interface for taking the desired action. For example, the system could provide a certificate for completion, a report to generate, email to send, and the like. At step 1103 the user performs the action.

At decision block 1104 it is determined if the action is complete. If not, the system returns to step 1103. If the action is complete, the icons and RN counters are updated accordingly.

Example Computer System

Figure 12:
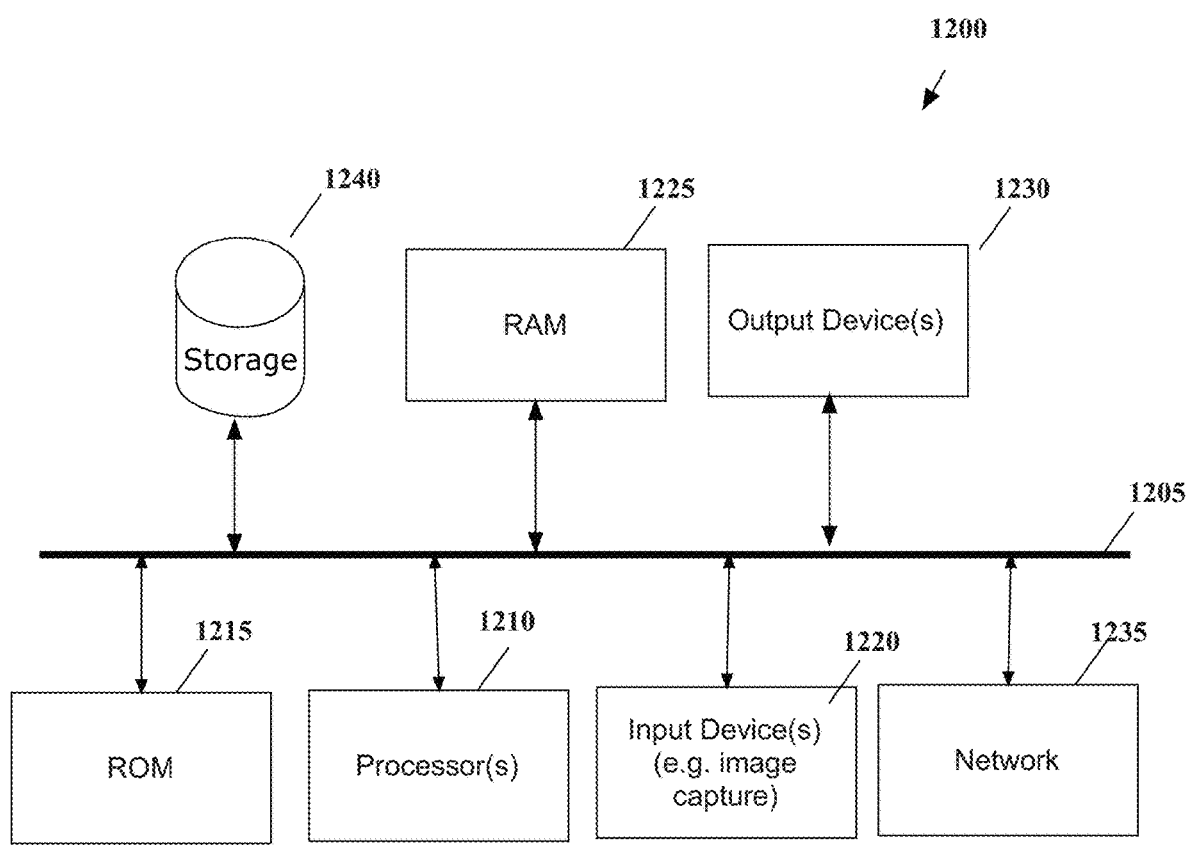
FIG. 12 is an example computer system in an embodiment of the system.

FIG. 12 illustrates an exemplary a system 1200 that may implement the system. The electronic system 1200 of some embodiments may be a mobile apparatus. The electronic system includes various types of machine-readable media and interfaces. The electronic system includes a bus 1205, processor(s) 1210, read only memory (ROM) 1215, input device(s) 1220, random access memory (RAM) 1225, output device(s) 1230, a network component 1235, and a permanent storage device 1240.

The bus 1205 communicatively connects the internal devices and/or components of the electronic system. For instance, the bus 1205 communicatively connects the processor(s) 1210 with the ROM 1215, the RAM 1225, and the permanent storage 1240. The processor(s) 1210 retrieve instructions from the memory units to execute processes of the invention.

The processor(s) 1210 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine-readable storage medium (also referred to as machine readable medium). When these instructions are executed by one or more of the processor(s) 1210, they cause the processor(s) 1210 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 1210. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 1200, define one or more specific machine implementations that execute and perform the operations of the software programs.

The ROM 1215 stores static instructions needed by the processor(s) 1210 and other components of the electronic system. The ROM may store the instructions necessary for the processor(s) 1210 to execute the processes provided by the system. The permanent storage 1240 is a non-volatile memory that stores instructions and data when the electronic system 1200 is on or off. The permanent storage 1240 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 1225 is a volatile read/write memory. The RAM 1225 stores instructions needed by the processor(s) 1210 at runtime, the RAM 1225 may also store the real-time video or still images acquired by the system. The bus 1205 also connects input and output devices 1220 and 1230. The input devices enable the user to communicate information and select commands to the electronic system. The input devices 1220 may be a keypad, image capture apparatus, or a touch screen display capable of receiving touch interactions. The output device(s) 1230 display images generated by the electronic system. The output devices may include printers or display devices such as monitors.

The bus 1205 also couples the electronic system to a network 1235. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 18(f) unless the element is expressly recited using the phrase "means for" or, in the case of a method claim, the element is recited using the phrase "step for."

What is claimed is:

1. A consolidated insurance management system comprising:
    in a centralized management system;
    a processing engine/database of an enterprise;
    an import/export engine coupled to the processing engine/database of the enterprise and at least one third-party source of data regarding vehicles, drivers, policies and policy coverages;
    a Vehicle Identification Number (VIN) decoding system at the centralized management system to validate vehicles acquired by the import/export engine;
    the processing engine/database to store data about the vehicles, drivers, policies, and policy coverages;
    a dashboard to display information and status about the data, wherein the dashboard is accessible by a user at the enterprise;
    a certificate engine to update coverage on a vehicle and to provide a coverage certificate
    Response Needed (RN) logic implemented in the processing/engine database of the centralized management system to identify any required responses for each vehicle of the vehicles and to automatically generate in real-time a graphical representation of required responses for each vehicle and to display the graphical representation to a user in a single location;
    the RN logic automatically filtering out and presenting only those vehicles that have a required response, and only displaying rows for vehicles requiring a response and wherein the RN logic displays responses needed in a response needed display region;
    displaying the vehicles in rows, with multiple columns for each vehicle where a first color icon in a row and column represents a response needed for that vehicle, and wherein the response needed display region includes a count of the number of responses need for the vehicles being displayed;
    the RN logic presenting an interface to the user to perform the needed response when an icon of the first color is clicked by the user, causing the system to present to the user an interface that allows the user to implement the needed response, and updating the count in the response needed display region when the needed response has been accomplished.

2. The consolidated insurance management system of claim 1 further including a graphical representation of status of data associated with vehicles and drivers.

3. The consolidated insurance management system of claim 1 wherein a call-to-action is presented to the user to update coverage on a vehicle.

4. The consolidated insurance management system of claim 1 further including an audit engine for tracking actions in the system.

5. The consolidated insurance management system of claim 1 further including a reporting engine for automatically generating reports associated with the system.

6. A method for automatically tracking and managing insurance coverage for an enterprise having an enterprise database comprising:
    using an import/export engine to import data from the enterprise database to a system database of a management system wherein the data comprises vehicles, vehicle identification numbers (VIN), drivers, vehicle transactions, active insurance policies, expiring insurance policies, premiums, and lienholders;
    wherein the import/export engine can also interface with third parties including governmental agencies to obtain Department of Transportation (DOT) information, Federal Motor Carrier Safety Administration (FMCSA) information, safety inspections, and can integrate transportation management systems and agency management systems;

a reporting engine coupled to the system database for generating custom reports comprising color-coded and icon-based grid of unit coverages that present enterprise status at a glance;

a certificate engine coupled to the system database for generating, granting, and delivering vehicle insurance certificates, based on one or more of values, owner, lienholder and type, including physical damage (PD), non-trucking (NT), and occupational accident (OA) combined on a single certificate;

a VIN decoder/analyzer to determine accuracy of VINs that are input into the system, including checking accuracy of VIN format, duplicate VINs, and vehicle description associated with a VIN Response Needed (RN) logic implemented in the system database of the management system to identify a required response and to automatically generate in real-time a graphical representation of required responses and to display the graphical representation to a user in a single location;

the RN logic automatically filtering out and presenting only those vehicles that have a required response, and only displaying rows for vehicles requiring a response and wherein the RN logic displays responses needed in a response needed display region;

displaying the vehicles in rows, with multiple columns for each vehicle where a first color icon in a row and column represents a response needed for that vehicle, and wherein the response needed display region includes a count of the number of responses need for the vehicles being displayed;

the RN logic presenting an interface to the user to perform the needed response when an icon of the first color is clicked by the user, causing the system to present to the user an interface that allows the user to implement the needed response and updating the count when the need response has been accomplished;

thereby providing automatic tracking and managing of insurance coverage for an enterprise in a single consolidated system.

* * * * *